Jan. 17, 1961 V. DOSSIN 2,968,598
METHOD FOR OBTAINING ETHYL ALCOHOL OF HIGH QUALITY
Filed Nov. 21, 1955 2 Sheets-Sheet 1

INVENTOR
VICTOR DOSSIN

United States Patent Office 2,968,598
Patented Jan. 17, 1961

---

2,968,598

METHOD FOR OBTAINING ETHYL ALCOHOL OF HIGH QUALITY

Victor Dossin, Paris, France, assignor to Lepage, Urbain & Cie, Paris, France, a corporation of France Filed Nov. 21, 1955, Ser. No. 548,224

Claims priority, application France Dec. 29, 1954

1 Claim. (Cl. 202—72)

The invention relates to a method of treatment of ethyl alcohols with a view to the elimination of their impurities. It is also directed to the apparatus for carrying this method into effect.

Ethyl alcohols, even when they are rectified, contain traces of impurities and odours, such as aldehydes, ethers, and original odours, the proportions of which may, in certain cases, exceed the authorized amounts, or which may prevent their use for certain applications and which must therefore be reduced or eliminated.

In accordance with the invention, this result is obtained by a thermo-chemical action applied to the alcohol to be purified. To this end, the alcohol is caused to circulate in a nest of tubes heated by steam to a temperature in the neighborhood of 130 to 140° C. or by any other means adapted to carry out this heating process, in order to obtain a mixed liquid-vapour phase. The impurities are then decomposed by the heating or are carried away by the alcohol vapour resulting from this treatment, with a possibility of catalytic action.

Figure 1:
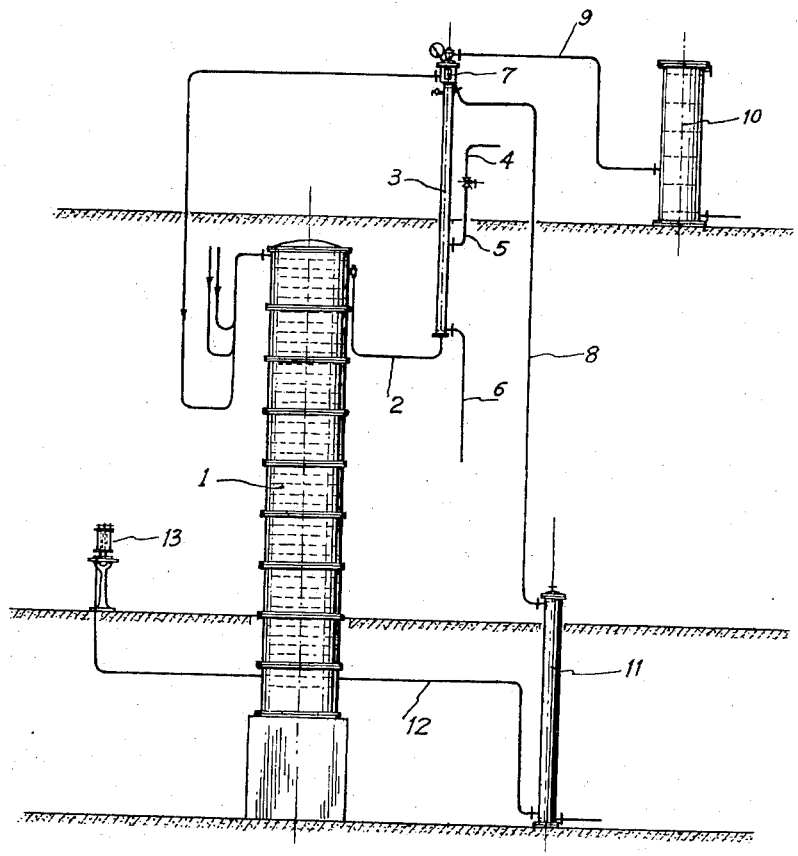
Figure 2:
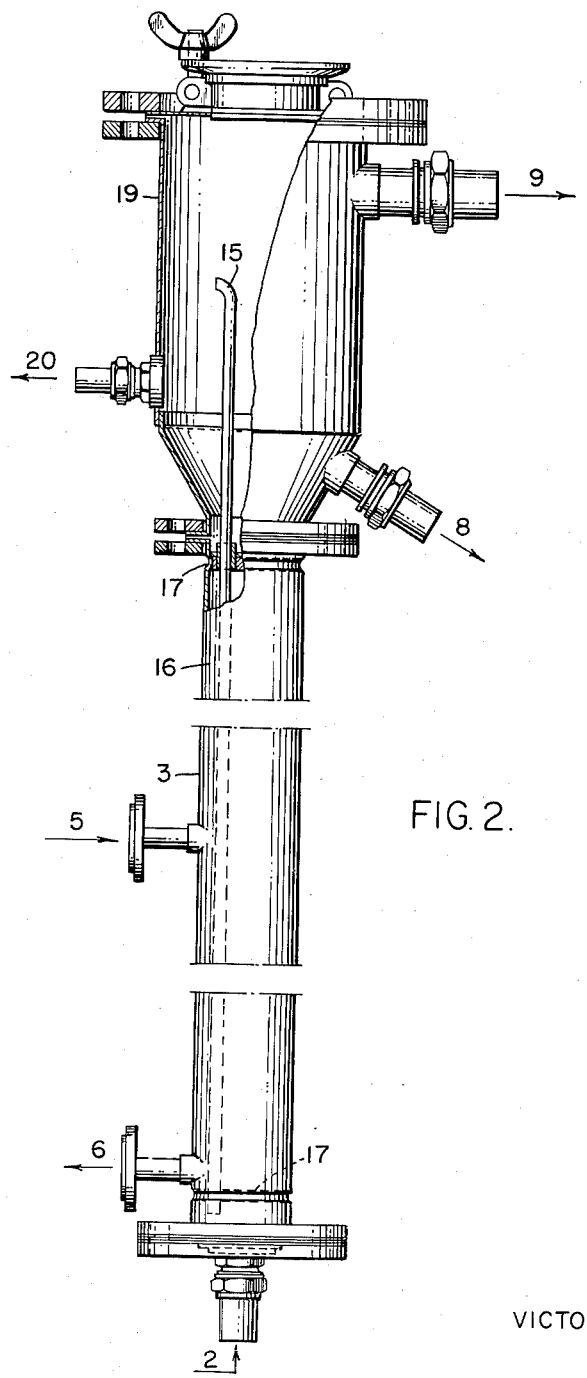

One form of treatment of ethyl alcohol in accordance with the method and by means of an apparatus in conformity with the invention will now be described, by way of example only and with no implied limitation, reference being made to the attached drawing, in which Figure 1 is a diagrammatic view of a part of a continuous rectification installation and Figure 2 is an enlarged view of a portion of the structure of Figure 1.

The ethyl alcohol is extracted from a standard type of column 1 with trays. It is directed through the conduit 2 towards the lower extremity of a heat exchanger or thermo-reactor 3. This apparatus contains a long nest of tubes for the passage of the alcohol, these tubes being heated to a temperature of 130 to 140° C., for example by steam which is introduced into the apparatus through the pipes 4 and 5, the water of condensation being evacuated through the piping system 6.

The heat applied to the tubes heats the alcohol which enters the tubes in liquid form, thus converting it to gaseous form in the upper portion of the heat exchanger. Taking into account the speed of flow of the alcohol, a mixed liquid-gaseous phase is obtained in the tubes. The liquid, together of course with the steam, rises up to the upper part of the thermo-reactor where a glass inspection window 7 enables the operation to be supervised.

The purified liquid alcohol is evacuated through the conduit 8, whilst the alcohol in vapor phase, which carries away the impurities with it, is directed through the conduit 9 towards the condenser 10 of the column of trays.

The purified liquid alcohol is passed into a cooler 11 and from thence a conduit 12 leads it to the test glass 13, from which it is collected.

In Figure 2, the tubes 15, which may vary in number, provide for the passage of alcohol. The space 16 intermediate the tubes 15 provides for the passage of a heating medium, such as steam, and is limited by the casing 3. The spaces 17 serve to space and retain the tubes 15.

A distributing head 19 is provided from which lead conduit 9 conducting the alcohol in gaseous form to the condenser 10 and conduit 8 conducting the alcohol to the cooler 11 and sample test tube 13.

An overflow passage 20 returns the excess alcohol to the upper rectifier plate.

In Figure 1, a faucet is shown at the outlet from the rectifier column 1 and in conduit 2 which permits the passage of a quantity of alcohol which is slightly greater than that drawn-off into tube 13.

The alcohol is discharged in the form of droplets from the tops of tubes 15.

The continuous cycle of rectification thus described only constitutes one example of the application of the method in accordance with the invention, which is clearly not limited to the improvement of the quality of rectified alcohol. The treatment in accordance with the invention may also be applied to de-hydrated or simply purified alcohol.

I claim:

Method for obtaining high grade ethyl-alcohol by reducing or eliminating impurities such as ethers and aldehydes from previously rectified ethyl alcohol which consists in passing the ethyl-alcohol through a heat exchanger, the walls of which are externally heated by steam to a temperature of about 130° to 140° C. said alcohol traveling through said heat exchanger at a sufficient rate to obtain a mixed liquid-vapor phase and separating the liquid alcohol from the alcohol in vapor phase which carries away the impurities.

References Cited in the file of this patent

UNITED STATES PATENTS

| | | |
|---|---|---|
| 896,460 | Prache et al. | Aug. 18, 1908 |
| 991,570 | Waterhouse | May 9, 1911 |
| 1,007,967 | Pampe | Nov. 9, 1911 |
| 1,052,214 | Castets | Feb. 4, 1913 |
| 1,937,786 | Ricard et al. | Dec. 5, 1933 |
| 2,226,828 | Moran | Dec. 31, 1940 |
| 2,640,013 | Wilton | May 26, 1953 |
| 2,711,388 | Mattern et al. | June 21, 1955 |

FOREIGN PATENTS

| | | |
|---|---|---|
| 152,573 | Germany | Apr. 19, 1903 |
| 465,233 | Great Britain | May 4, 1937 |